United States Patent [19]

Hubbard

[11] 4,432,087

[45] Feb. 14, 1984

[54] DEMULTIPLEXER CIRCUIT

[75] Inventor: William M. Hubbard, Colts Neck, N.J.

[73] Assignee: Bell Telephone Laboratories, Incorporated, Murray Hill, N.J.

[21] Appl. No.: 408,227

[22] Filed: Aug. 16, 1982

[51] Int. Cl.³ .............................................. H04J 3/02
[52] U.S. Cl. ...................................... 370/55; 370/84; 370/112
[58] Field of Search ................... 370/55, 84, 112, 95, 370/89, 58

[56] References Cited

U.S. PATENT DOCUMENTS

| | | | |
|---|---|---|---|
| 2,834,833 | 5/1958 | Segerstrom et al. | 370/55 |
| 3,867,579 | 2/1975 | Colton et al. | 370/102 |
| 3,982,077 | 9/1976 | Clark et al. | 370/84 |
| 4,121,054 | 10/1978 | Popkin | 370/55 |
| 4,377,861 | 3/1983 | Huffman | 370/112 |

OTHER PUBLICATIONS

Marconi Co., "Single Channel Drop and Insert", Telecommunications, Sep. 1973, pp. 41–44.
"Speeding the Delivery of Data Communications" by W. P. Michaud, Jr. and S. Narayanan, Bell Laboratories Record, Jun. 1979, pp. 163–168.

Primary Examiner—Douglas W. Olms
Assistant Examiner—Wellington Chin
Attorney, Agent, or Firm—John K. Mullarney

[57] ABSTRACT

A demultiplexer circuit which extracts from an incoming time division multiplexed digital bit stream any combination of PCM encoded words or data bits, irrespective of the rate of latter or the position of the data bits in a given channel or channels. The demultiplexer circuit includes a random access memory (12) for storing information as to the bit(s) to be demultiplexed out of the incoming digital bit stream. A counter (13) operates in synchronism with the received bit stream and the output thereof serves to access the random access memory to provide output signals indicative of the bit(s) carrying information for the subscriber station. These output signals are utilized to read the digital signals intended for said station into other random access memory (31, 41). A summing circuit (16–19) is coupled to the input of said other memory so that conference calls are summed in real time. The digital signals are then read out of the other memory at a steady rate, with a stored data signal being similarly outputted irrespective of the rate of the signal or its position in a given channel or channels.

5 Claims, 4 Drawing Figures

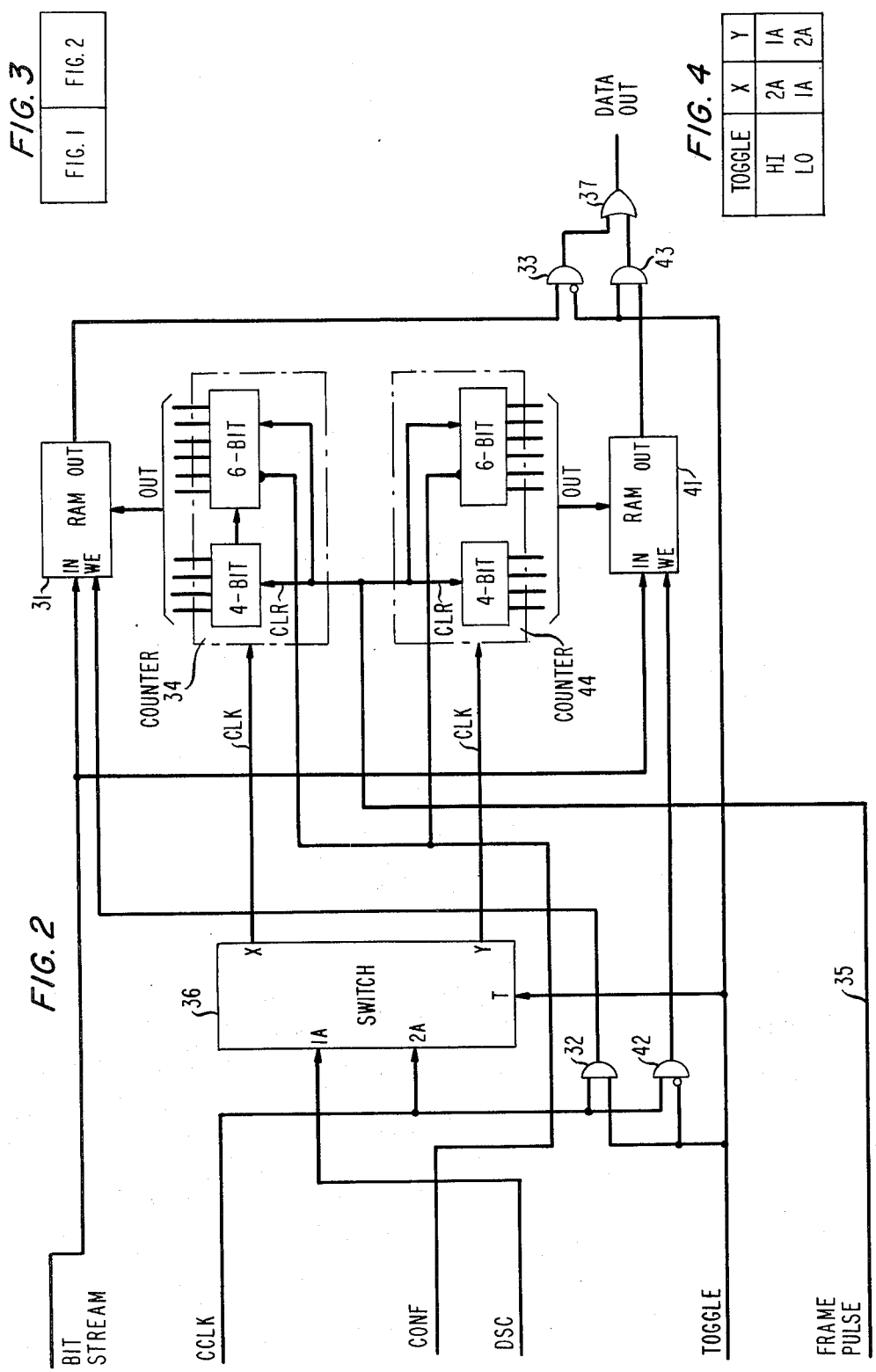

DEMULTIPLEXER CIRCUIT

TECHNICAL FIELD

The present invention relates to digital transmission systems and, more particularly, to a demultiplexer circuit for extracting from an incoming time division multiplexed digital bit stream any PCM encoded word or any combination of PCM encoded words (in separate channels) or data bits, irrespective of the rate of the latter or even the position of the data bits in a given channel or in multiple channels.

BACKGROUND OF THE INVENTION

A proposed digital transmission system consists of digitally encoded speech signals transmitted in time division multiplexed channels with plural channels devoted to conference calls between three or more (up to 127) conferees. The system also proposes the transmission of data at rates from 8 kB/s to 8 MB/s. It permits the allocation of 1, 2, ... data bits to a data subscriber in a chosen channel while allocating other bits of the same channel to other and different data subscribers; and, for high data rates it allocates a multiple of channels to a high speed data subscriber.

Digital transmission systems that carry both PCM (pulse code modulated) speech signals and data at multiple data rates (i.e., 2.4, 4.8 and 9.6 kB/s) are, of course, known in the art; e.g., see the article "Speeding the Delivery of Data Communications" by W. P. Michaud, Jr. and S. Narayanan, *Bell Laboratories Record*, June 1979, pp. 163-8. The various prior art approaches share one or more of the shortcomings of the apparatus described in the cited article. For example, in the cited article, special plug-in units—called dataports—are dedicated to a given input data terminal. A dataport is really a specialized channel unit of a channel bank, such as the D3 or D4. A dataport converts input 2400, 4800 or 9600 bit-per-second (bps) data signals into a 64,000 bps digital signal (8 bits per time slot, repeated at an 8 kHz rate). Thus, there is an inherent redundancy in the group of bits in each time slot. Further, for example, if a 9600 bps data signal is transmitted, each eight bit word of data is repeated five times. Such an approach is, of course, wasteful in terms of bandwidth. And the dedicated channel unit approach limits a transmission channel to one and only one input data signal during a given connection.

One of the stumbling blocks in achieving a more flexible approach, in the transmission of PCM encoded voice (especially in the case of conference calls) and multiplexed multiple rate data signals, lies in the problem of extracting (only) the desired signal(s) from the multiplexed bit stream. This extraction operation—or demultiplexing—is particularly troublesome should one desire to use the multiple bits of a given channel for different data at different rates; and it is especially burdensome should one further desire to distribute the multiple data bits of a given data terminal over multiple transmission channels.

SUMMARY OF THE INVENTION

The present invention relates to a demultiplexer for the aforementioned proposed transmission system. The demultiplexer apparatus is capable of extracting any PCM word or any combination of words from a time division multiplexed digital bit stream, irrespective of the time slot or channel location(s) and number of such words. It also permits a real time summing of all the PCM words devoted to a conference call with very little additional circuitry. And, it is capable of extracting the data bits for a given data station regardless of the rate of the same or the position of the data bits in a channel or channels. This, of course, without alteration of the data bits intended for other and different data stations.

In a preferred embodiment of the present invention demultiplexer apparatus comprises a (random access) memory that stores the information as to the bit or bits to be demultiplexed out of each frame of an incoming time division multiplexed digital bit stream. A counter operates in synchronism with the received bit stream and the output thereof serves to access the memory to provide output signals indicative of those bits in the incoming bit stream which carry information for the given station. These output signals are used to read the incoming digital signals intended for said given station into another (random access) memory. Summing circuitry is coupled to the input of the latter memory so that conference calls are summed in real time. The digital signals are then read out of the latter memory at a steady rate, with a stored data signal being similarly outputted irrespective of the rate of the same or its position in a given channel or channels.

BRIEF DESCRIPTION OF THE DRAWING

The invention will be more fully appreciated from the following detailed description when considered in connection with the accompanying drawings in which:

FIGS. 1 and 2, when arranged as shown in FIG. 3, show a detailed schematic block diagram of a preferred embodiment of the present invention; and FIG. 4 is a table useful in the explanation of the invention.

DETAILED DESCRIPTION

Figure 1:
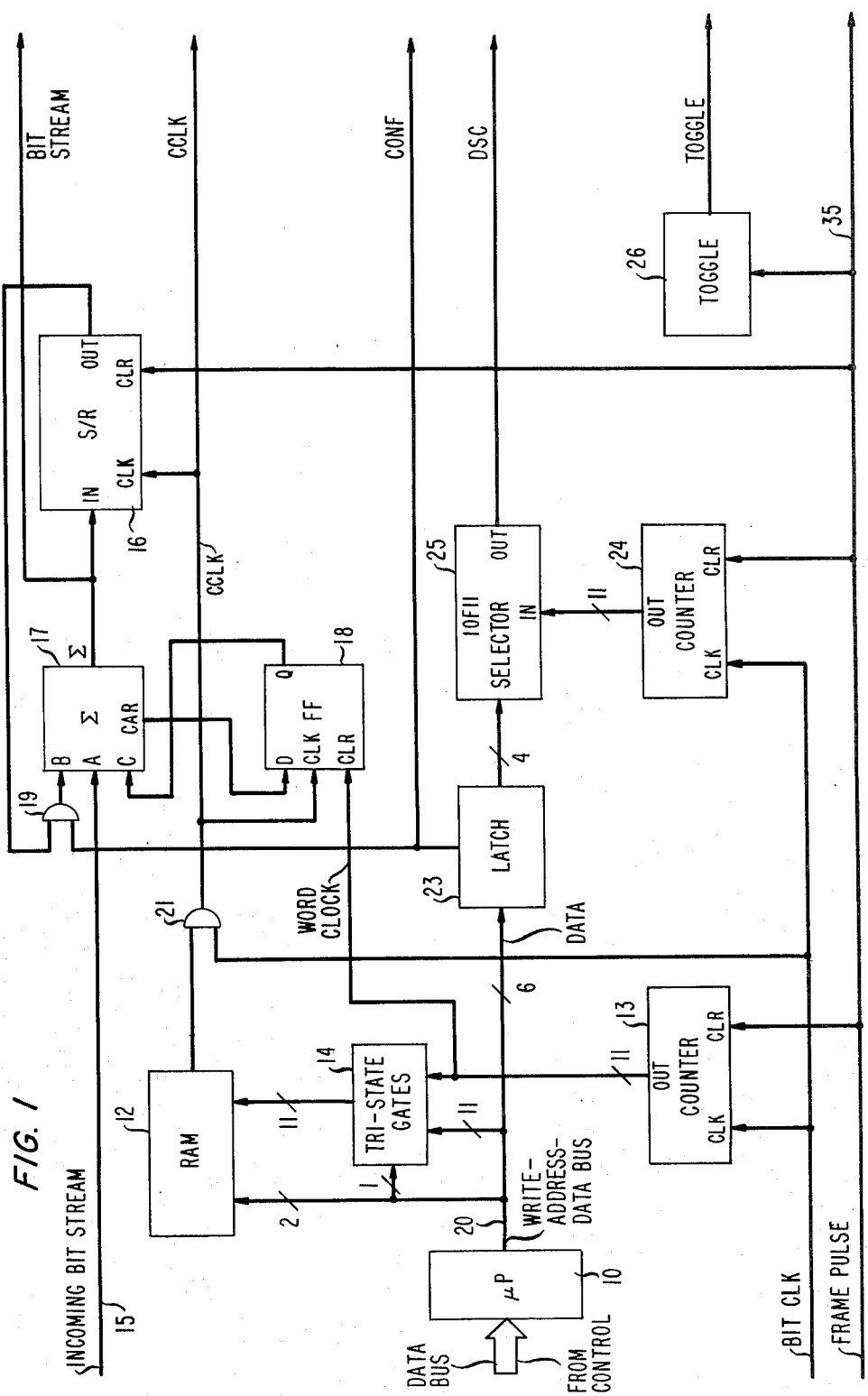

To facilitate a comprehension of the present invention, the aforementioned proposed digital transmission system will be described briefly. The proposed system is particularly advantageous for use in a dedicated loop network, such as used by a corporation that comprises multiple, geographically removed, locations. In such a loop network, besides the normal one-to-one interconnections between subscribers, conference connections between an unrestricted number of conferees is desirable. It is also essential that data terminals and computers, typically operating at multiple data rates, be interconnected in as flexible a manner as possible.

The digital bit stream of this time division multiplexed transmission system comprises a repetitive frame consisting of W words or channels, each of which consists of B bits (e.g. W=128, B=16). The sampling rate is 8 kHz, and a frame is 125 μsec in duration. The system codes voice samples as linear PCM. This is advantageous in that conferencing can be done digitally by adding together the voice samples of all the participants before decoding. In addition, the 16 bit words can be used for transmitting data at rates from 8 kB/s to 8 MB/s, or even higher. It permits the allocation of 1, 2, ... 16 of the bits of a chosen channel to a given data terminal, while allocating other bits of the same channel to other data terminals operating at the same or different rates; for high data rates it allocates a multiple of channels to a high speed data terminal. Selection of conferencing or data mode, of data rate, of which bits to use for "subrate data", etc., are processor controllable and dynamically assignable.

The demultiplexer circuit of the invention will be described in terms of the frame format set forth above, wherein a frame consists of 128 channels with 16 bits per channel for carrying 16 bit linear PCM or, for example, subrate data at one or more different rates. It is to be understood, however, that the foregoing system description is only for the purpose of facilitating an understanding of the demultiplexer circuit of the invention. It should be evident to those skilled in the art that the present invention is in no way limited to the described system (or frame format) and can find utility in other and different transmission systems. The flexibility offered by a demultiplexer constructed in accordance with the invention will be discussed in greater detail hereinafter.

Referring now to FIGS. 1 and 2 of the drawings, there is shown a demultiplexer circuit in accordance with the invention. Except for the microprocessor 10, which can be time-shared by a number of localized subscriber stations or terminals, the apparatus shown in the drawings is dedicated to one, and only one, subscriber terminal. However, this subscriber terminal may be operating in any one of several different modes— e.g., conferencing or data mode.

A centralized control or central processor (not shown) performs all of the normal functions encountered in setting-up and in taking-down a given call, be it PCM voice or data. The request for service, type of service designation, ringing, etc. are handled by the central control. The necessary supervision and signaling between the various subscribers and the centralized control can be carried out using a dedicated channel of the frame. Alternatively, the requisite supervision and signaling can be carried out over a Common Channel Interoffice Signaling Link, such as that now in use in the telephone industry. Neither the specific controller operations nor the necessary signaling are germane to the present invention and are considered to be sufficiently established and well known as to render unnecessary further discussion herein.

The requisite supervision and signaling information from the controller is delivered to microprocessor 10. This information will indicate if the transmission is from a single PCM encoded voice subscriber or, alternatively, is a conference call involving three or more subscribers (up to a maximum of 127 conferees), as well as the channel (s) being used for the same. If the incoming transmission is data, the microprocessor is informed as to the rate thereof, the channel(s) occupied by the incoming data bits, and the exact location of the data bits in the channel(s). The microprocessor 10 translates or converts the data received from control into the output signals to be described hereinafter. This translation is quite straightforward.

The random access memory 12 (RAM) is used to store the information as to the bit or bits to be demultiplexed out of the incoming time division multiplexed digital bit stream on lead 15. The RAM has a storage capacity at least equal to the number of bits in a frame. With 128 words or channels of 16 bits each, a frame consists of 2048 bits, which is the storage capacity needed for RAM 12. For this purpose, a small capacity RAM can be used or alternatively, a portion of a large capacity RAM might be used with the remaining capacity of the same utilized for other and different purposes. For example, a large capacity RAM might also be used in part to provide the memory functions of FIG. 2, to be described hereinafter. Thus, the RAM 12 has 2048 storage locations which are associated with or related to the 2048 bits of the received bit stream. When the received transmission, in one or more bit positions, is intended for a given subscriber station, a binary one ("1") is stored in the corresponding storage location(s) in the RAM. That is, a "1" in bit location k (k=0 to 2047) signifies that the digital signal in bit k is to be multiplexed out of the received bit stream.

The output of the microprocessor 10 comprises a plurality of leads which are designated the write-address-data bus 20. The microprocessor 10 provides thirteen (13) output bits, over 13 separate leads, to the RAM 12; it provides 11 address bits, one write enable bit, and one data bit—which is a binary one ("1") at call set-up time. The output of the microprocessor 10 comprises a plurality of leads which are designated the write-address-data bus 20. The eleven address bits from the microprocessor 10 are, of course, used to load the RAM in the appropriate location(s) ($2^{11}=2048$). When a given bit is to be multiplexed out of the received digital bit stream, the eleven address bits select the corresponding storage location in the RAM and a ("1") is sent to RAM. When the write enable lead is temporarily enabled, the eleven eleven address signals are coupled to the RAM via the tri-state gates 14 and the described write-in is carried out in a conventional fashion. This operation is repeated for each of the bits to be multiplexed out of the received bit stream; the time for each write-in is measured in microseconds and hence a complete loading of the RAM is carried out quickly. When a call is ended, the binary one bits stored in RAM 12 are all then reset to "0".

With the RAM 12 appropriately loaded with 1s in the address locations corresponding to bits to be multiplexed out of the received digital bit stream and 0s in all the other address locations, the 11-bit counter 13 serves to access the RAM to provide output signals indicative of the bit(s) carrying information for the given station. The 11-bit counter 13 counts from 0 to 2047 and then recycles in synchronism with the received digital bit stream. The recovery circuits (not shown) recover the framing pulses and generate synchronous bit clock pulses. Such recovery circuits are standard and well-known in the art; see the patents to, J. R. Colton and H. Mann, U.S. Pat. No. 3,867,579 issued Feb. 18, 1975. A frame pulse signal is delivered to the clear (CLR) input of counter 13 and the bit clock signals are delivered to the clock (CLK) input so that the counter 13 counts in bit synchronism with the incoming bit stream. The 11-bit output of counter 13 is delivered to the RAM (as the address lines) via the tri-state gates 14. Thus, the 2048 storage locations of the RAM are sequentially accessed and if a "1" is encountered during this operation an output signal from the RAM is indicative of the fact that the corresponding bit position of the incoming bit stream is carrying information for this station. The counter continually accesses the RAM in the described manner, but this operation is momentarily and arbitrarily interrupted whenever new data from the microprocess 10 is to be written into RAM.

As the RAM 12 is successively accessed, in the manner described, output signals are provided which are indicative of the bits in the incoming bit stream that are intended for this subscriber station. These RAM output signals are delivered to the AND gate 21, as is the bit clock pulses from the recovery circuit (not shown). The AND gate output consists of one or more comb clock signals (CCLK) in synchronism with one or more bits of interest to the subscriber station. The comb clocks from AND gate 21 are used to read the bit(s) of interest in the incoming digital bit stream into the shift register 16. To this end, the output of AND gate 21 is delivered to the clock (CLK) input of register 16. The digital bit stream on lead 15 is coupled to the input of the register 16 via the summing circuit 17. Leaving the summer 17 aside for the moment, it will be evident that only when the shift register 16 is clocked by the comb clock signals from gate 21 will bits of the digital bit stream be read into the shift register. In this manner, only the bit or bits of interest will be stored in the register 16. At the beginning of the next frame, the shift register 16 is cleared by a frame pulse delivered to its clear (CLR) input. The shift register 16, summer 17, flip-flop 18 and AND gate 19 are used for conference calls and will be described in detail hereinafter. For any call other than a conference call, the summer 17 functions simply to pass input signals to its output without modification.

Another and different write enable bit on bus 20 serves to enable the latch 23 to receive data bits from the microprocessor 10. The data bits delivered to the latch 23 are, of course, different from the data delivered to the RAM. That is, the bus 20 is time shared to deliver different signals to different circuit components at different times. Out of the data bits delivered to latch 23 advises the latch that the incoming message is a conference call and therefore the AND gate 19 should be enabled. The other data bits advise the latch that the incoming message is from a data terminal and it tells the latch the data rate thereof.

The frame pulse is used to clear (CLR) the counter 24. This is an 11-bit counter that counts to 2048 and then recycles. Counter 24 is clocked by the bit clock pulses from the recovery circuitry. Counter 24 provides eleven separate outputs to the 1-of-11 selector 25. The counter, in effect, functions as a frequency divider to provide output signals at 11 different clock rates, i.e., 8 kB/s, 16 kB/s, 32 kB/s, 64 kB/s, 128 kB/s, 256 kB/s, 512 kB/s, 1.024 MB/s, 2.048 MB/s, 4.096 MB/s and 8.192 MB/s. For example, a ÷2048 output provides a single output signal once per frame (8 kB/s); the ÷1024 output provides two output signals per frame (16 kB/s); the ÷512 output offers four output pulses per frame (32 kB/s), and so on. It is, of course, a common expedient to use a counter as a frequency divider. The above-recited clock rates correspond to the assumed transmitted data rates. For example, if a data terminal makes use of a single bit in a given word or channel, the transmission rate is 8 kB/s (note, this is the frame rate); whereas, if the data terminal uses all 16 bits of a given word for transmission purposes, the transmitted data rate is 128 kB/s (16×8 kHz); and if the data terminal used half the channels of a frame for data transmission purposes, the data transmission rate would be 8.192 MB/s (128 kB/s×64). Accordingly, data can be transmitted using 1,2,4,8 or all 16 bits of a given channel to transmit data at an 8,16,32,64 or 128 kilobit rate. If two channels are used for data transmission, the data rate is 256 kB/s; if 4 channels are used, the data rate is 512 kB/s; if 8 channels are used, the transmission data rate is 1.024 MB/s, etc. However, and as will be more evident hereinafter, the principles of the present invention are not so constrained. For example, with being moderate, straightforward, circuit modification, data might also be transmitted using 3,5,6,7 or 9 through 15 bits of a word or channel and still be readily extracted by a demultiplexer circuit designed in accordance with the present invention. The only significant changes that this would entail would be the use of a more elaborate, but still state of the art, counter 24 and a 1-of-n selector for selector 25.

As the name suggests, the 1-of-11 selector 25 selects the clock rate to be utilized. This selection is carried out under the control of the signal from latch 23, which, as previously described receives the appropriate data rate information from the microprocessor 11. Since there are eleven possible alternatives in this selection process, a four-lead bus is provided between latch 23 and selector 25. The output of selector 25 is designated the data speed clock (DSC), and it corresponds to the rate of the incoming data that is to be extracted from the received digital bit stream.

Frame pulses are delivered to the input of toggle 26 which, as the name implies, toggles or alternates between two states (HI and LO) in response to the successive frame pulses.

The RAMs 31 and 41 of FIG. 2 are identical and each has a storage capacity of 1024 bits, which is half the bits of a frame; a data rate of 8.192 MB/s requires this many bits per frame. For even higher rate data requiring more bits per frame, the capacity of the RAMs can be readily enlarged to accommodate the same. The incoming digital bit stream is delivered to the input (IN) of each RAM 31 and 41. The output of toggle 26 is coupled to the gates 32 and 42, along with the comb clock pulses (CCLK). The output of gate 32 serves as the write enable (WE) for RAM 31, and the output of gate 42 serves as the write enable (WE) for RAM 41. When the toggle signal is HI, the gate 32 is enabled, and gate 42 is inhibited or disabled, and vice versa when the toggle is LO. Accordingly, it will be obvious that the RAMs are alternately enabled for write-in purposes.

The output of RAM 31 is delivered to the gate 33 and the output of RAM 41 is delivered to gate 43. The toggle signal is also coupled to each of these gates as shown. When the toggle signal is HI, the gate 43 is enabled and gate 33 is inhibited, and vice versa when the toggle is LO. Accordingly, it will be evident that the read-out from the RAMs also occurs alternately. And, more importantly, these write-in and read-out operations are 180° phase shifted or 180° out-of-sync. That is, the write-in to one RAM occurs at the same time as the read-out of the other. Thus, while bits are being written into RAM 31, the bits previously stored in RAM 41 are being read out, and vice versa. The write-in operation may be sporadic or in bursts depending upon the location of the bits in the received bit stream intended for the subscriber station. However, the read-out operation always occurs at a steady rate, this rate being determined by the data rate of the transmission for the subscriber station.

The 10-bit counters 34 and 44 are identical and each serves to address sequentially its associated RAM. The counters 34 and 44 are cleared (CLR) at the beginning of each frame by a frame pulse on lead 35. Each 10-bit counter is depicted in FIG. 2 as comprising a 4-stage or 4-bit and a 6-stage or a 6-bit segment, the reason for this will be evident later. For present purposes, each counter can be considered simply as a 10-stage counter. The counters 34 and 44 are clocked (CLK) by the respective X and Y outputs of switch 36. The switch 36 functions in a manner similar to a double-pole, double-throw switch; see the truth table of FIG. 4. This switch is toggled between its two states by the toggle signal from toggle circuit 26. When the toggle is HI, the output terminal X is connected to the comb clock signal (CCLK) delivered to the 2A input terminal, and the output terminal Y is connected to the data speed clock (DSC) delivered to the 1A input terminal. Alternatively, when the toggle is LO, the X terminal is connected to 1A and the Y terminal is connected to the input terminal 2A.

For purposes of explanation, assume that the toggle is HI; the X terminal of switch 36 is therefore connected to the 2A input terminal which receives the comb clock signal (CCLK). The counter 34 is thus clocked by CCLK signal. The received bit stream is delivered to the input of RAM 31 via summing circuit 17 and the CCLK pulses are delivered to the write enable (WE) of RAM 31 via the enabled AND gate 32. The CCLK pulses are coincident with the bit(s) of the received bit stream that are intended for this subscriber station and therefore the desired bit(s) are written into RAM 31. The CCLK pulses also sequentially clock the counter 34 and the counter in response thereto delivers sequential address information to the RAM 31. Accordingly, as each CCLK pulse occurs, an incoming data bit is written into the enabled RAM 31 in an address location designated by counter 34. In this manner, bits of data or PCM speech are extracted from the incoming digital bit stream and placed in juxtaposed locations in the RAM.

While bits are being stored in RAM 31, the bits stored in RAM 41 the previous frame are read-out. For the case previously assumed (i.e., toggle is HI), the gate 42 is inhibited and hence there can be no write-in to RAM 41. Also, the terminal Y of switch 36 is connected to the input terminal 1A and, therefore, the data speed clock (DSC) is coupled to the clock (CLK) input of counter 44. The DSC signal output from selector 25 is indicative of the data rate of the bits stored in RAM 41; note, a 16-bit PCM word has a (data) rate of 128 kB/s. As the counter 44 counts sequentially at the DSC clock rate, the RAM 41 is accessed at this rate and data is thus read out at this rate via the enabled AND gate 43 and OR gate 37. Accordingly, while the write-in to a RAM may be sporadic and/or occur in bursts, the stored data signal is read out at a steady rate. The rate at which each signal is read out corresponds, of course, to the original rate of the signal.

When the next frame pulse occurs, the toggle output is LO and the roles of the two RAMs and their associated circuitry are reversed. That is, incoming bits are now written into the RAM 41 and the bits stored in RAM 31, in the manner peviously described, are now read out. This reversal of roles for the RAMs 31 and 41 is repeated every frame throughout the duration of the call or data transmission.

The conferencing of multiple PCM encoded conferees is carried out in the following manner. The AND gate 19 is normally disabled, but is enabled by an output signal from the latch 23 when a conference call is indicated. The summing circuit 17 and the "D" type flip-flop 18 are interconnected with the shift register 16 so that conference calls are carried out (i.e., summed) in real time. That is, multiple conferees in separate and distinct channels are conference connected by digitally adding together the linearly encoded voice samples of all the participants prior to decoding. Since the shift register 16 is of 16-bit capacity there is little likelihood of "saturation" in the conference mode.

The conferencing or summing operation is carried out in the following manner. Assume first that a digital word is already stored in the shift register 16. The first bit of this word is in the last stage of the shift register 16 and it is coupled back to the B input of the summing circuit 17 via the enabled AND gate 19. With the arrival of the next word of interest (i.e., the PCM encoded word of another conferee), which is applied to the A terminal of the summing circuit, the A and B binary bit inputs will be added and the result thence shifted into the input stage of shift register 16. This binary addition is repeated 16 times so that the binary bits of the stored word are successively added to said next word of interest. Thus, there is now stored the cumulative sum of two conferees. If there are additional conferees, occupying subsequent time slots, the binary bits of the same are added to the cumulative sum stored in the shift register 16. However, as will be appreciated by those skilled in the art, if the A and B binary bit inputs are both a binary one, the sum is a binary zero and a "carry" operation is called for. In this instance, the carry (CAR) output of the summing circuit 17 is coupled to the D input of the flip-flop 18. Thus, a carry bit is temporarily stored in the flip-flop 18. The Q output of this flip-flop is coupled to the C input of the summing circuit so that it is accounted for in the summing operation. The flip-flop 18 is clocked by the output from gate 21, and it is cleared (CLR) for each new word. This clear signal is, in effect, the word clock (128 per frame) derived from the output of the counter 13. The summing circuit 17 is not a clocked device; circuits for performing such a binary addition are available commercially.

The following table may be of value in understanding the operation of the summing circuit 17.

| No. of 1s on A, B and C inputs | Output to register 16 | Output to flip-flop 18 |
|---|---|---|
| 0 | 0 | 0 |
| 1 | 1 | 0 |
| 2 | 0 | 1 |
| 3 | 1 | 1 |

When a conference call is indicated, the output signal from latch 23, that enables gate 19, also serves to inhibit the last 6-stages of the counters 34 and 44. Thus, the counters only count to sixteen, which of course, is the number of bits in a PCM speech encoded word. For a conference call, the sixteen bits of the first conferee will be written into sixteen juxtaposed storage locations, in either RAM 31 or 41 in the manner previously described. With the arrival of the next word of interest (i.e., the encoded word of another conferee) a binary addition occurs and the two words of these two conferees are summed, as described. The result of the summing operation is also deposited in the same juxtaposed storage location as the bits of the first word, i.e., the write-in is destructive. If there are additional conferees, occupying subsequent time slots, the binary bits of the same are added to the cumulative sum and the result deposited in the same sixteen juxtaposed storage locations in RAM 31 or 41. After all of the conferees are summed in real time, the cumulative result of the summing operation will be in the aforementioned sixteen storage locations of RAM 31 or 41—ready to be read out.

The foregoing description assumed that the sixteen PCM encoded bits of each of the conferees would be in separate and distinct channels. This need not be so. For example, rather than clear the flip-flop 18 by the word clock, one could simply count the bits of an incoming conferee and then clear the flip-flop 18 after a count of sixteen (16). In this manner, the 16-bits of each conferee could be deposited in two or more words of the incoming digital bit stream. All that is essential in this regard is that the bits of the conferees not be intermingled.

Similarly, of course, the 16-bits of a single PCM speech encoded signal need not appear in a single 16-bit word or channel of the transmitted digital signal; rather the 16-bits of a single subscriber can be deposited in any of the unused locations in a frame and still be demultiplexed out of the received bit stream in accordance with the invention.

When the microprocessor 10 is advised that the incoming signal to be demultiplexed out of the incoming bit stream is a PCM speech encoded signal or signals (i.e., for a conference call), the appropriate data is sent to latch 23 to enable the selector 25 to select the 128 kB/s clock output of counter 24. Thus, the DSC output of selector 25 serves to alternately clock the counters 34 and 44 at this 128 kB/s rate (16×8 kHz) so that the PCM bits are read out of store (RAMs 31 and 41) at the 128 kB/s rate.

It should be apparent at this point that subrate—and multiword—data classes of service are handled in much the same way, at least as far as the hardware of the invention is concerned. Further, the frame bits assigned to a customer or subscriber (PCM speech or data) need not be consecutive or be in the same word or channel; in fact, they can be scattered throughout the entire frame. Multiword data (and even multipoint service) need not be restricted to using whole words; e.g., if 4 words (64 bits) per frame are required by a data subscriber, the bits can be scattered throughout the frame and still be extracted from the multiplexed digital bit stream by a demultiplexer constructed in accordance with the present invention. This is particularly advantageous when the network is congested with many subrate—data users and only residual fragments of channels are available. Finally, as will be appreciated by those in the art, it is feasible to contemplate completely eliminating the concept of dividing a frame into W words of B bits and instead allocate the frame bits to the various subscribers on a bit-by-bit basis.

It will be appreciated by those skilled in the art that a multiplexer circuit is essentially a mirror image of the demultiplexer circuit with which it interacts, remotely. Accordingly, it is to be understood that the principles of the present invention are also applicable to multiplexer circuits except that a multiplexer would not contain the summing circuits used for conferencing.

The above-described embodiment is merely illustrative of the principles of the present invention and numerous modifications and variations therein may be devised by those skilled in the art without departing from the spirit and scope of the invention.

What is claimed is:

1. Demultiplexer apparatus for a time division multiplexed digital bit stream which includes n-bit PCM encoded speech signal(s) and/or one or more data signals at different data rates comprising memory means (12) having a storage capacity at least equal to the number of bits in a frame of said multiplexed digital bit stream, means (10, 14) for storing in said memory means information as to the bit or bits to be demultiplexed out of said multiplexed digital bit stream, counter means (13) operating in bit synchronism with said digital bit stream and serving to access the memory means to provide output signals indicative of the bit or bits carrying information for the demultiplexer subscriber station, means (32, 34, 42, 44) using said output signals to read the bit or bits in said digital bit stream intended for said station into another memory means (31, 41), and means (33, 34, 43, 44) for reading out the bit or bits stored in the latter memory means at a steady rate, each data signal being read out at a different but steady rate irrespective of the number of data bits in a frame or the position thereof in a frame.

2. Demultiplexer apparatus as defined in claim 1 including means (16-19) coupled to the input of the latter memory means (31, 41) for summing in real time all PCM encoded conference signals intended for said station, with the cumulative sum being stored in the latter memory means at the end of each frame.

3. Demultiplexer apparatus for a time division multiplexed digital bit stream which includes n-bit PCM encoded speech signal(s) and/or one or more data signals at different data rates comprising a random access memory (12) having a storage capacity at least equal to the number of bits in a frame of said multiplexed digital bit stream, means (10, 14) for storing in said memory information as to the bit or bits to be demultiplexed out of said multiplexed digital bit stream, counter means (13) operating in bit synchronism with said digital bit stream and serving to access said memory to provide output signals indicative of the bit or bits carrying information for the demultiplexer station, means (32, 34, 42, 44) using said output signals to read the bit or bits in said digital bit stream intended for said station into memory means (31, 41), and means (33, 34, 43, 44) for reading out the bit or bits stored in said memory means at a steady rate, each data signal being read out at a different but steady rate irrespective of the number of data bits in a frame or the position thereof in a frame, and means (16-19) coupled to the input of the memory means (31, 41) for summing in real time all PCM encoded conference signals intended for said station, with the cumulative sum being stored in the memory means at the end of each frame.

4. In a digital transmission system wherein digitally encoded speech signals are transmitted in time division multiplexed fashion along with data signals of multiple data rates, a comb clock generator for use in the multiplexer/demultiplexer apparatus of said digital transmission system and being characterized by a random access memory (12) having a storage capacity at least equal to the number of bits in a frame of the time division multiplexed transmission signal, means (10, 14) for storing in said random access memory information as to the bit or bits of said transmission signal designated for a particular transmission or call, a counter (13) operating in bit synchronism with the time division multiplexed transmission signal, the output of said counter serving to access the random access memory to provide output signals therefrom indicative of the designated bit or bits, and gate means (21) for ANDing said output signals with a bit clock signal that is synchronous with the bits of said transmission signal, the output of said gate means serving to clock selected bits of said transmission signal into another memory (31 or 41).

5. In a digital transmission system wherein a time division multiplexed digital bit stream includes n-bit PCM encoded speech signals(s) and/or one or more data signals at multiple data rates, a demultiplexer circuit for a subscriber station of said digital transmission system being characterized by a random access memory

(12) having storage locations at least equal in number to the number of bits in a frame of said multiplexed bit stream, means (10,14) for storing in said locations data as to the bit or bits to be demultiplexed out of said multiplexed bit stream, a counter (13) operating in bit synchronism with said bit stream and serving to read the random access memory to provide output signals therefrom indicative of the bit or bits carrying information for the subscriber station, a gate (21) for ANDing said output signals with a bit clock signal that is bit synchronous with said bit stream, a pair of random access memories (31 41) for receiving said bit stream, the output of said gate serving to clock the desired bit or bits of said bit stream into one or the other of said pair of memories, means (36) to alternately enable said pair of memories in successive frames, a summing circuit (16–19) coupled to the input of said pair of memories to sum in real time the PCM encoded conference calls intended for said subscriber station with the cumulative sum being stored in one of said pair of memories at the end of each frame, and means (33, 34, 43, 44) for alternately reading out the digital signals stored in said pair of memories, the read out from one of said pair of memories occurring while a write in to the other of said pair is taking place, each data signal being read out at a different but steady rate irrespective of the number of data bits in a frame or the position thereof in a frame.

* * * * *